Dec. 21, 1954

P. S. DICKEY 2,697,351

PNEUMATIC TELEMETERING APPARATUS

Filed Nov. 14, 1950

INVENTOR.
PAUL S. DICKEY
BY
Raymond W. Junkins
ATTORNEY

United States Patent Office 2,697,351
Patented Dec. 21, 1954

2,697,351

PNEUMATIC TELEMETERING APPARATUS

Paul S. Dickey, East Cleveland, Ohio, assignor to Bailey Meter Company, a corporation of Delaware Application November 14, 1950, Serial No. 195,524

1 Claim. (Cl. 73—389)

My invention relates to apparatus for indicating, recording, or otherwise exhibiting and/or controlling the value of a position, measurement or variable. More particularly the invention relates to such systems wherein a fluid pressure is established representative of that which is to be measured or controlled, and then the fluid pressure is used to actuate an exhibiting or controlling device.

While not necessarily so limited, the invention is particularly adapted and useful in pneumatic telemetering systems with air under pressure as the active fluid.

In present measurement and control a wide variety of variables are encountered and each may have any of almost numberless values or ranges. The variable may be temperature, pressure, rate of fluid flow, conductivity, speed, electrical values, or the like; or perhaps the position of an object in space or relative to another object.

It is a particular object of my present invention to provide apparatus wherein a substantially standardized type of transmitter is located at the point where the variable is to be measured and establishes a uniform pneumatic pressure thereafter transmitted to a central location and utilized in terms of the variable being measured. In other words, regardless of the nature or value of the variable being transmitted, it is converted at the point of measurement to be within a predetermined relatively low pneumatic pressure range which may be readily transmitted over considerable distances to a point of use. Such standardization reduces to a minimum the problem of transmitting pressures or other difficult values over considerable distances.

A further object is to provide a pneumatic telemeter transmitter of universal applicability wherein variables, positions, and the like are converted to within a standard range of air pressure for remote or local telemetering.

A specific object of my invention is to provide a compact telemetering transmitter which produces an observed indication of the variable and simultaneously produces an output loading pressure representative of the variable and indicated in simultaneous comparison with the value of the variable.

A further object of the invention is to provide a pneumatically operated power amplifier whereby the available power of the responsive device, such as a Bourdon tube, for positioning an exhibiting means or performing useful work, is increased.

Another object is to provide a pneumatically operated telemetering system whereby a value of a variable, the position of a movable member, or the like, may be exhibited at a point remote from the point of measurement.

Still another object is to provide apparatus whereby a relatively weak force representative of a variable value, condition, or position is amplified in translation into a pneumatic or similar fluid pressure and the amplified fluid pressure is made available for actuating exhibiting or controlling apparatus relatively adjacent or relatively remote from the measuring means.

It will be apparent as the description proceeds that my invention may be put to a wide variety of uses such as for exhibiting the value of a temperature, pressure, relative humidity, electro-motive force, or for transmitting commands or other intelligence, all of which are to be considered as coming within the scope of my invention.

Figure 1:
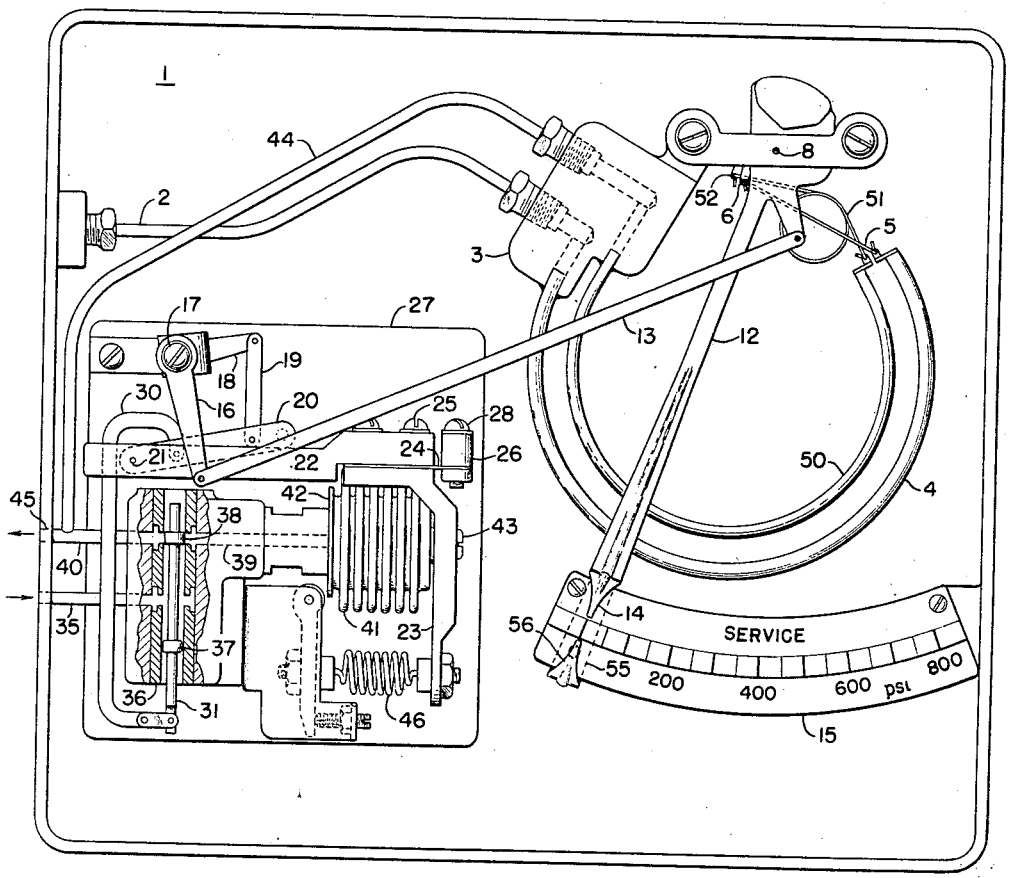
Fig. 1 is a front elevation, partially in section, to slightly less than actual size, of a commercial embodiment of my invention.

Referring to Fig. 1, I therein show a pneumatic telemetering transmitter adapted for use with my invention. The transmitter 1 is usually located immediately adjacent the point of measurement to avoid transmitting the measurement at its actual value over considerable distances. I preferably locate the transmitter 1 immediately adjacent steam pipes, water pipes, and the like, and there establish a representation of the measurement within a predetermined common range of pneumatic pressures which preferably may be of the order of 0–30 p. s. i., for transmittal to any desired point of visual manifestation or of control.

With relatively minor modification the transmitter 1 is applied to a wide variety of variables. The particular transmitter of Figs. 1 and 2 will be described as receptive to a static fluid pressure such for example as the pressure in a steam pipe; for establishing a pneumatic loading pressure within the range 0–30 p. s. i. representative of the actual static pressure of the steam. To this end the transmitter 1 is located preferably closely adjacent to the steam pipe to which it is connected by a short pipe. The steam pressure to be measured is made available in a tubing connection 2 entering a base block 3 which is rigidly supported within the casing of the transmitter 1.

Figure 2:
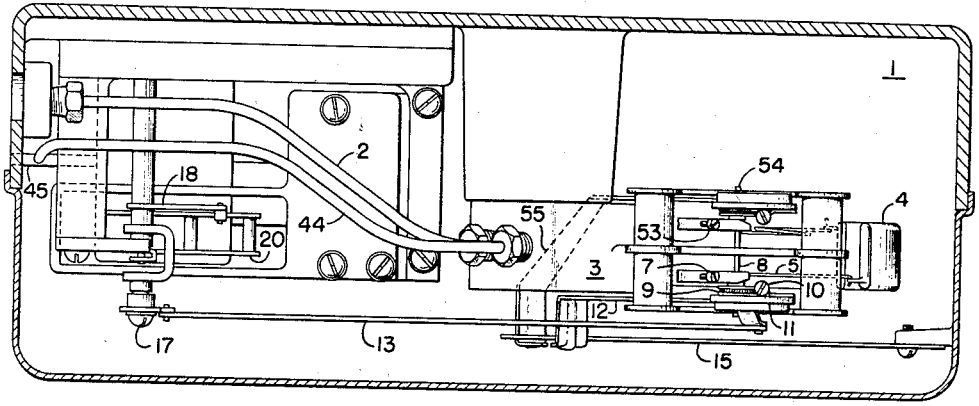
Fig. 2 is a plan view of the device shown in Fig. 1.

The operative or active element of the transmitter is illustrated in Figs. 1 and 2 as a Bourdon tube 4 having one end permanently fastened to the base block 3. The interior of the Bourdon tube 4 communicates with the passage 2 while the free end of the Bourdon tube is connected through a link 5 with a projection 6 of a range adjustment 7 through which a shaft 8 is angularly positioned. Carried by the shaft 8 is a toothed disc 9 connected through an adjusting screw 10 with a drive disc 11 angularly positioning a pointer arm 12 and for positioning a link 13.

Thus it will be seen (Fig. 1) that an increase in pressure within the Bourdon tube 4 causes the tube to tend to straighten out and, acting through the link 5, to position the pointer arm 12 in a counterclockwise direction around the shaft 8 while moving the link 13 generally from left to right (in the drawing). The adjustment 7 provides a range change possibility, while the adjustment 10 is a zero adjustment.

It will be seen that the pointer arm 12 has a pointer 14 cooperating with an indicating scale 15 which has been arbitrarily marked to a range of 0–800 p. s. i.

The drive link 13 is arranged to angularly move an arm 16 about a pivot center 17 for angularly positioning a second arm 18; the arms 16, 18 forming a bell-crank pivoted at 17. Suspended from the arm 18 is a connecting link 19 joining a floating cradle 20 whose other end is pivoted as at 21 to a member 22 angularly moved with an L-shaped plate 23 about a center generally indicated at 24. The imaginary axis 24 of angular motion is embodied in a leaf spring which is clamped between the member 22 and one leg of the L-shaped plate 23 by screws 25. The other end of the leaf spring is held to an extension 26 of a base plate 27 by screws 28.

Pivoted to the floating cradle 20, intermediate the points of connection of link 19 and pivot 21, is a yoke 30 comprising positioning means for a pilot stem 31.

At 35 I make available a source of compressed air preferably at about 40 p. s. i. This air supply pressure is available within a pilot sleeve 36 between lands 37 and 38 which are formed on the pilot stem 31. The land 37 is a seal land closely fitting the bore of sleeve 36 and substantially preventing air leakage to the atmosphere. The land 38 cooperates with ports in the sleeve 36, the one port joining a passage 39 and the other port joining the passage 40. The passage 39 communicates with the interior of a bellows 41 having one end fixed as at 42 and the other end fastened to the L-shaped member 23 by a screw 43. Expansion of the bellows 41, as by an increase in internal pressure, will move the bell-crank 23, 22 in a counterclockwise direction around the center 24.

The passage 40 communicates with a tube 44 and an output connection 45.

It will be seen that an increase in pressure within the Bourdon tube 4, resulting in a movement of link 13 toward the right (Fig. 1) will give a counterclockwise movement to the arms 16 and 18, acting through the elements 19, 20 and 30 to move the pilot stem 31 upwardly proportionately. This results in a movement of land 38 upwardly relative to the passages 39, 40 allowing pressure from within the sleeve 30 to build up in the passages 39, 40, 44, 45 and within the bellows 41. As pressure within the bellows 41 increases the bellows expands, thus moving the arm 23 in a counterclockwise rotation about the pivot center 24 resulting in a downward positioning of the pivot 21, yoke 30 and pilot 31. This downward movement of the pilot 31 tends to return the land 38 to a shut-off position relative to the passages 39, 40. A balance condition of stability is reached when, for any given position of the arm 16, the pressure within the bellows 41 has increased or decreased to a value representative of the position of arm 16 whereby the return positioning of the pilot 31, through the agency of the bellows 41 and yoke 30, stops any further change in pressure within the bellows 41. The result is that for any position of the arm 16 there is a corresponding pressure within the bellows 41 as well as in the passages 39, 40, 44 and 45.

Loading the bellows 41 and its contained pressure is a spring 46 which may be adjusted for range or rate of the unit.

The pipe 44 leads to a passage in the base block 3 communicating with a second Bourdon tube 50 which is connected through a link 51 with a projection 52 of a range adjustment 53 through which a shaft 54 is angularly positioned in axial alignment with the shaft 8. In a manner similar to that previously described, the shaft 54 is arranged to position a pointer arm 55 having a pointer 56 cooperating with the graduations of the scale 15. As evident in Fig. 1 the pointer arm 55 lies below the pointer arm 12 moving in a plane parallel to the arm 12 about the common axis 8, 54 of the two arms 12, 55.

The over-all arrangement and desideratum is that, regardless of the position of the pointer 14 along the scale 0–800 p. s. i., the pointer 56 will be in alignment with the pointer 14 when the pressure within the Bourdon tube 50 is in desired proportionality to the actual steam pressure effective within the Bourdon tube 4. Preferably the output pressure of the pilot 31, 36 is in a range 0–30 p. s. i. so that, in the present embodiment, the pointer 14 moves through a range 0–800 p. s. i. which corresponds to a range of 0–30 p. s. i. for the pointer 56. For example, when the pointer 14 is opposite 400 p. s. i. then the pressure within the Bourdon tube 50 should be 15 p. s. i. and this pressure is also the pressure at the output connection 45. Thus, for every value of steam pressure effective within the Bourdon tube 4, there is a proportional pneumatic pressure value established at the output connection 45 within a preselected range, in this instance within the range 0–30 p. s. i. Thus, through the agency of the transmitter 1 of Figs. 1 and 2, I continuously establish a pneumatic loading pressure proportional at the output connection 45 to the static steam pressure available at the tube 2. Visually evident through the agency of pointers 14, 56 and scale 15 is the coincidence of such proportionality or any departure therefrom requiring adjustment of the various adjustment elements provided.

While I have indicated that a preferable loading pressure range for pneumatic telemetering is 0–30 p. s. i., it will be understood that this is not limiting in any respect but is chosen only by way of convenience. In general, the universal transmitter (regardless of nature or range of variable) is located at or near the variable, it establishes a pneumatic loading pressure in a predetermined range, for example 0–30 p. s. i., for transmittal to any remote indicating, recording or control point where the receiver is calibrated in terms of the variable.

Certain features of this disclosure, not claimed herein, are disclosed and claimed in the copending applications, H. H. Gorrie S. N. 169,751 now Patent 2,675,015 issued April 13, 1954 and T. A. Green et al. S. N. 176,382.

While I have chosen to illustrate and describe certain preferred embodiments of my invention, it will be understood that these are by way of example only and are not to be considered as limiting.

What I claim as new, and desire to secure by Letters Patent of the United States, is:

A telemetric transmitter and indicator unit, including in combination, a housing, an arcuate scale mounted in the housing, a first Bourdon tube mounted in the housing and connected to an external source of variable fluid pressure, a first pointer arranged in the housing to be actuated over the scale by the first Bourdon tube, a fluid pressure pilot valve mounted in the housing and actuated by the first Bourdon tube to produce an output fluid pressure representative of the variable fluid pressure, a second Bourdon tube mounted in the housing, a second pointer arranged in the housing to be actuated over the scale by the second Bourdon tube, and the second Bourdon tube being responsive to the fluid pressure output of the pilot valve, the arrangement of the Bourdon tubes and the pointers and the scale being such that the pointers will align across the scale face when the output fluid pressure of the pilot valve is representative of the variable fluid pressure.

References Cited in the file of this patent

UNITED STATES PATENTS

| Number | Name | Date |
|---|---|---|
| 829,368 | Clarke | Aug. 21, 1906 |
| 1,628,137 | Giesler | May 10, 1927 |
| 1,960,241 | Deerwester | May 29, 1934 |
| 2,128,833 | Martin | Aug. 30, 1938 |
| 2,284,795 | Belaeff | June 2, 1942 |
| 2,324,579 | Hart | July 20, 1943 |
| 2,333,300 | Dickey et al. | Nov. 2, 1943 |
| 2,369,887 | Eckman | Feb. 20, 1945 |
| 2,520,468 | Moore | Aug. 29, 1950 |
| 2,529,875 | Howard | Nov. 14, 1950 |